W. BUCKLEY.
MEANS FOR PREVENTING INCRUSTATION OF BOILERS.
APPLICATION FILED AUG. 22, 1914.

1,133,092.

Patented Mar. 23, 1915.
3 SHEETS—SHEET 1.

Witnesses
F. R. Heinrichs
C. C. Hine

Inventor
William Buckley
By
Attorney

W. BUCKLEY.
MEANS FOR PREVENTING INCRUSTATION OF BOILERS.
APPLICATION FILED AUG. 22, 1914.

1,133,092.

Patented Mar. 23, 1915.

3 SHEETS—SHEET 2.

Witnesses
J. R. Heinrichs

Inventor
William Buckley
By
Attorney

W. BUCKLEY.
MEANS FOR PREVENTING INCRUSTATION OF BOILERS.
APPLICATION FILED AUG. 22, 1914.

1,133,092.

Patented Mar. 23, 1915.
3 SHEETS—SHEET 3.

Witnesses

Inventor
William Buckley
By
Attorney

UNITED STATES PATENT OFFICE.

WILLIAM BUCKLEY, OF ASHLAND, WISCONSIN.

MEANS FOR PREVENTING INCRUSTATION OF BOILERS.

1,133,092.  Specification of Letters Patent.  Patented Mar. 23, 1915.

Application filed August 22, 1914. Serial No. 858,161.

*To all whom it may concern:*

Be it known that I, WILLIAM BUCKLEY, a citizen of the United States, residing at Ashland, in the county of Ashland and State of Wisconsin, have invented certain new and useful Improvements in Means for Preventing Incrustation of Boilers, of which the following is a specification.

My invention relates to means for preventing the incrustation of boilers, particularly locomotive boilers, by the deposit of scale or other mineral matter from the water in the generation of steam, and its primary object is to provide a device adapted for application to a locomotive tender, whereby quantities of a water-softening or incrustation-preventing agent may be automatically supplied to the feed water at required intervals.

A further object of the invention is to provide an apparatus, controlled automatically by the level of the water in the tender tank, whereby specified amounts of a material or compound, held in containers, may be supplied to and dumped into the water in the tank at proper intervals, and an excess supply of the compound or material to the tank avoided.

A still further object of the invention is to provide an apparatus of the character defined which will be controlled solely by the level of the water in the tank, thus obviating the necessity of supplying auxiliary power to operate the same.

The invention consists in the features of construction, combination and arrangement of parts hereinafter described and claimed, reference being had to the accompanying drawings, in which—

Figure 1:
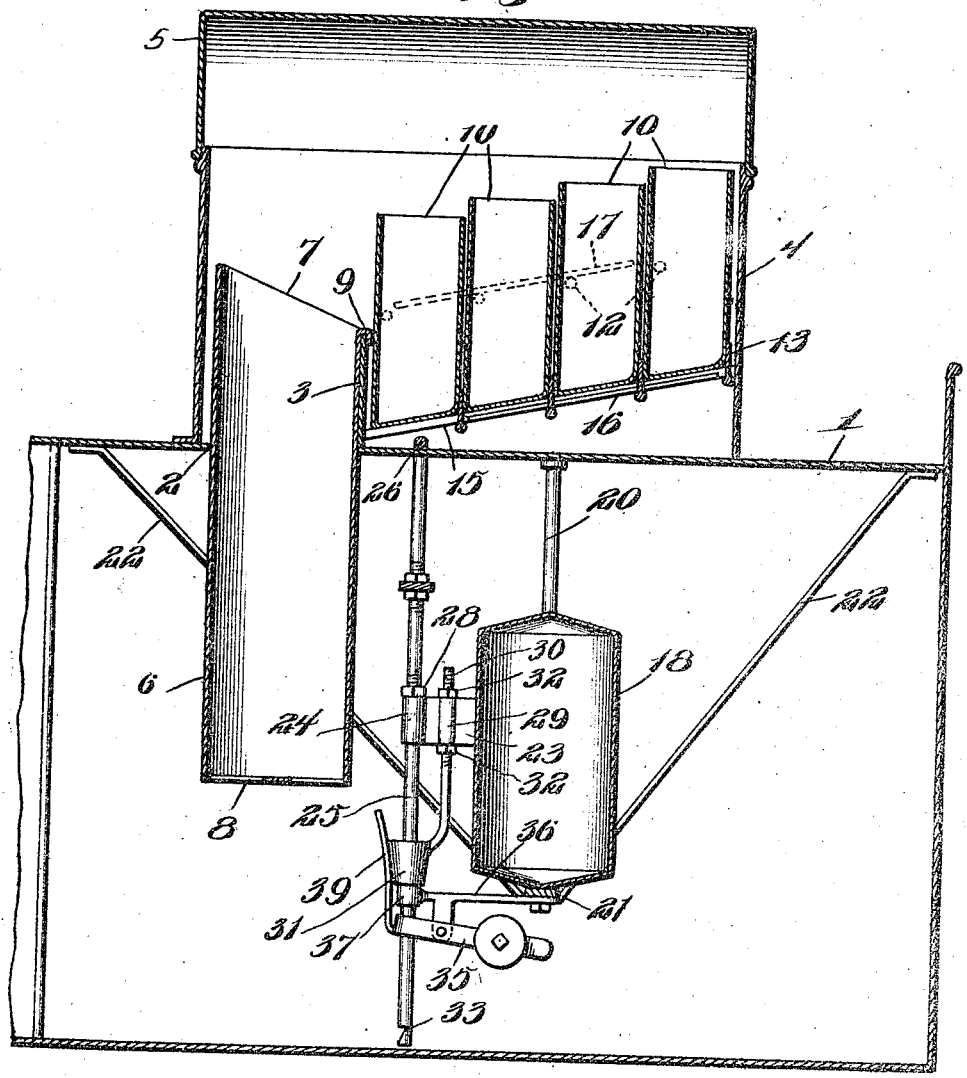
Figure 2:
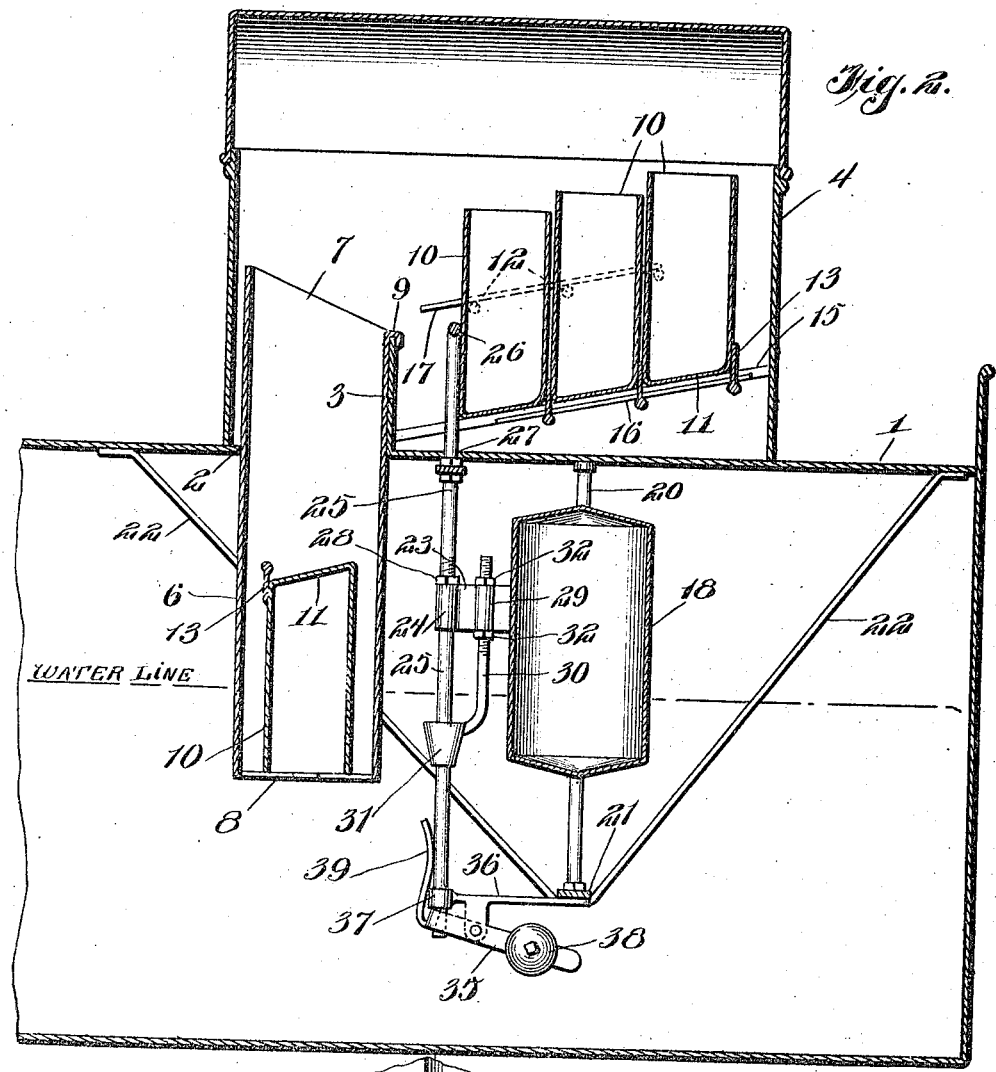
Figure 3:
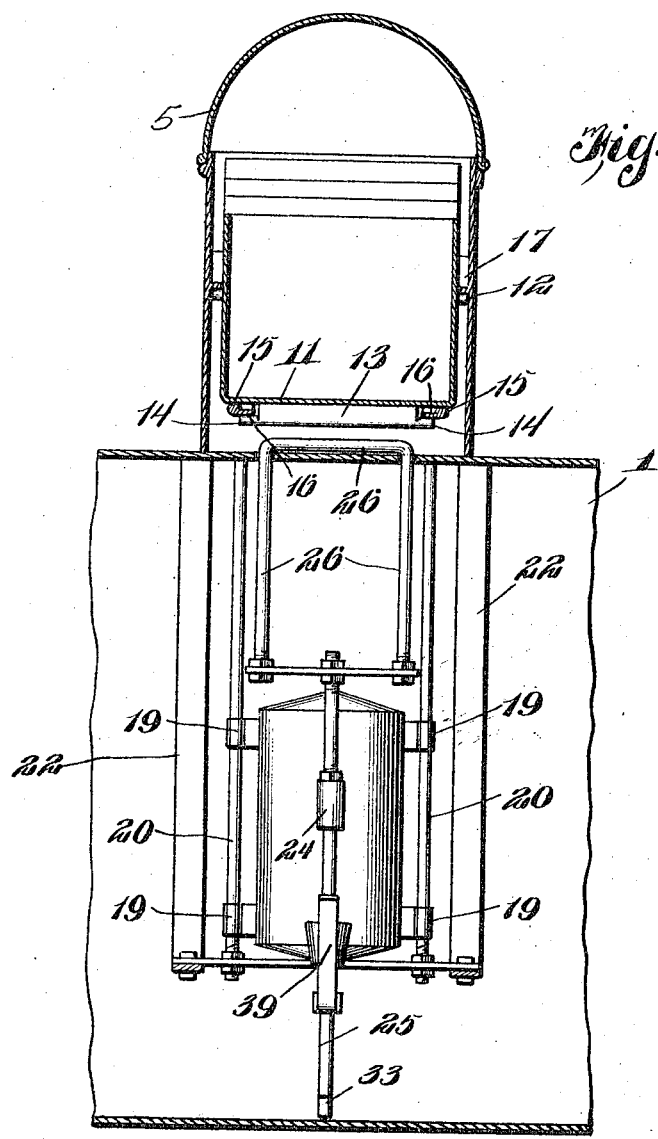
Figure 5:
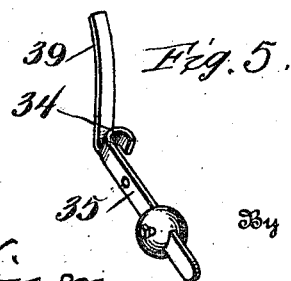

Figure 1 is a vertical longitudinal section through the device and a portion of a locomotive tender tank, showing the position of the parts when the water is at its minimum level, and one of the containers in position to be dumped upon the supply of water to the tank; Fig. 2 is a similar view showing the said container dumped and the parts of the apparatus held in locked position to prevent feed motion of the remaining containers of the series; Fig. 3 is a vertical transverse section through the parts as illustrated in Fig. 1; Fig. 4 is a fragmentary perspective view of the receiver; and Fig. 5 is a detail perspective view of the latch and co-acting trip member.

Referring to the drawings, 1 designates a water supply tank, such as the tank of a locomotive tender, the top of which, in accordance with my invention, is provided with an opening 2 and a suitable supporting bracket or upright 3. Supported upon the top of the tank is a casing 4 which may be of any preferred construction, and which is provided with a removable lid or cover 5, secured in any closed position, in practice, in any preferred manner. Fitted within and extending through the opening 2 is a receiver, chute or trough 6, comprising an oblong rectangular body having an open sloping top 7 and a perforated or grated bottom 8. The receiver projects downwardly into the tank below the maximum water line and upwardly into the casing 4 and is provided at its upper end with a supporting hook 9 to engage over the upright 3, whereby it is removably sustained in position.

Arranged within the casing 4 is a suitable number or series of receptacles or containers 10, in each of which is placed a suitable amount or charge of the compound or material which is to be supplied to the water in the tank to soften the same or to otherwise act thereon to prevent the deposit of mineral or other matter contained in the water within the tank and boiler or to cause the deposit of any foreign matter contained in the water within the tank to prevent its passage to the boiler. Each of these containers or receptacles consists of an elongated oblong rectangular vessel open at the top and having a sloping or inclined bottom 11. Each of said containers is provided at its opposite sides with projecting guiding and stop pins 12, arranged about midway of the length of said container, and adjacent to the front wall thereof. Each of said containers has also secured to its rear wall a bar or plate 13 which projects below its inclined bottom 11 and extends transversely thereof and is provided with laterally extending guide and stop pins 14. The inclined bottoms of the series of containers 10, of which any suitable number may be employed, rest upon an inclined trackway extending downwardly toward the lower portion of the sloping upper end of the receptacle 6, said trackway being formed by a pair of inclined rails 15 and having projecting flanges 16 extending a portion of the length thereof, and disposed upon the sides of the casing above said rails are upper stop rails or flanges 17 which are correspondingly inclined to the rails and slope also toward the sloping upper end or mouth of the receptacle 6. The containers are arranged one in rear of the other and are movable for an automatic feed action by gravity and under the motion of the tank when the tender is traveling down the sloping trackway 16 toward the receptacle 6. The pins 12 of the receptacle project under the rails 17 while the lugs 14 project under the flanges 16 of the rails 15 whereby the containers are guided oppositely on their feed motion and held from upward movement or displacement under the jars and vibrations of the tender when the locomotive is running.

The construction and arrangement of the parts described is such that when the forward container contacts with the bracket 3 the stop pins 12 of said container will pass beyond the lower ends of the flanges 17, while the lugs 14 of the cross bar 13 of said container will at the same time have passed beyond the lower ends of the flanges 16 of the rails 15, whereby when said container is elevated it will tilt upon the lower edge of the sloping mouth 7 of the receptacle 6 and be dumped in an inverted position into the said receptacle and upon the bottom 8 thereof, as clearly shown in Fig. 2, so that the contents of said container will be discharged through the grated bottom 8 into the water in the tank 1.

The mechanism for controlling the series of containers in regular order, and at proper intervals, is controlled by the level of the water in the tank 1. This mechanism comprises a vertically movable float 18, adapted to rise and fall in the water, said float being provided with guide sleeves 19 engaged in a pair of spaced guide rods or bars 20 depending from the top of the tank 1 and connected at their lower ends by a cross bar 21 reinforced from the tank by suitable braces 22. The float is also provided with a bracket arm 23 terminating in a guide sleeve 24, through which projects a vertically movable or reciprocating lifting or dumping rod 25 carrying a bail-shaped head or engaging member 26 at its upper end, which is movable through guide openings 27 in the top of the tank and projects into the casing 4 at a point in advance of the lower end of the rails 16. A nut or other suitable abutment 28 is adjustably mounted on the rod 25 and rests upon the guide sleeve 24, whereby the rod is adapted to be moved upwardly with the float, and the position of the float with respect to a particular portion of the rod may be varied. The bracket arm 23 is also provided with an eye 29 for the passage of the threaded upper end of a rod 30, the lower end of which carries a conical trip member 31 slidably engaging the rod 25, the said rod 30 being adjustably secured in position by nuts 32. It will thus be understood that the float and trip member may be adjusted vertically with respect to the rod, and the trip member with respect to both the float and rod, so that the operation of said parts may be varied, according to any variation which may occur with regard to the desired maximum level of the water in the tank 1, with the effect of securing a reliable operation of the dumping mechanism at the required periods.

The lower end of the lifting or dumping rod 25 is notched to provide a latched recess or shoulder 33 adapted to be engaged by a hooked end 34 of a latch member 35 pivoted to a bracket arm 36 secured to the bar 21, which bracket arm also carries a guide sleeve 37 through which the lower end of the lifting or dumping rod is movable, the construction being such that when the dumping rod is shifted to the limit of its upward movement it will be automatically engaged by the latch 35, the hooked end of which seats in the recess 33 and under the shoulder formed thereby, and thus locks the lifting rod from descent. An adjustable weight 38 or its equivalent is provided for moving the latch into operative position when the notch or recess comes into position for engagement thereby, and a curved trip arm 39 is provided upon the hooked end of the latch for engagement with the trip member 31 for the automatic retraction of the latch upon the descent of the float and for maintaining the latch in retracted position during the lowering of the dumping rod and until it is again elevated into dumping position. The trip arm 39 is curved or cam-shaped so as to be properly engaged by the tapered or conical trip member 31, as illustrated particularly in Fig. 1.

In the operation of the device, the containers are filled with the desired compound or substance which is to be supplied to the water and then are arranged in tandem order, as shown in Fig. 1, upon the inclined trackway, with the stop pins and lugs of the first or lower container clear of the stop flanges or rails, while the stop pins and lugs of the other containers of the series are in engagement with the stop and guide rails, the first container of the series being thereby in position to be elevated and dumped. Fig. 1 shows the position of the parts when the water has passed below its minimum level and the tank should be replenished, from which it will be seen that the bail-shaped head 26 of the lifting rod is disposed beneath the first container of the series and the float and rod are at the limit of their downward movement. When the tank is replenished with water to bring the water therein up to the normal level the float rises and in so doing elevates the lifting or dumping rod until the trip device 31 clears the trip arm 39 and the notched end of the rod is engaged by the latch device, as shown in Fig. 2, whereby the rod is locked from downward movement. On its upward movement, the rod comes in contact with and elevates the first container of the series, which is thereby raised until its lugs 14 engage the stop rail 17, whereupon the container is tilted forwardly and downwardly and dumped into the receiver 6 with its open end downward, whereby its contents are discharged through the grated bottom 8 of said receiver into the water in the tank 1. The dumping rod is held locked and elevated, so as to lie in the path of the next succeeding container and to hold the containers from forward feeding movement while the water in the tank remains at its normal level, or until the water descends to a point at which a replenishing of the tank is required. The float gradually descends with the water and when the water reaches its minimum level the trip device 31 engages the trip arm 39 and retracts the latch 35, thus releasing the lifting rod 25 which again drops by gravity to the position shown in Fig. 1, ready for a repetition of the operation above described to lift and dump the second container of the series into the receiver to supply another charge of the compound or material to the water. When the rod descends, the series of containers, being unrestrained from movement, feed downwardly, and these successive actions of dumping the container, holding the remaining containers from movement, releasing the containers for movement and resetting the dumping rod for action, and actuating the dumping rod to dump a container, are automatically carried out at properly timed periods by the level of the water in the tank; whereby a proper proportion of the compound or material, and no more, will be supplied to the water at the times needed. When all the receptacles are empty, the receiver containing the same may be withdrawn from the tank and casing, the containers removed therefrom and refilled, and the parts again placed in position for operation. The receiver is made of sufficient depth and width so that a number of containers may be received therein and the contents thereof permitted to drop by gravity through a grated bottom without any interference, it being understood that any portion of the compound which may be retained by any containers within the receiver will be dislodged through the rocking motion of the tender, so that a reliable fed of all of the compound or material to the water will be secured. By adjusting the float and movable trip member 31 with relation to the lifting rod, the action of the rod may be governed according to the intended maximum and minimum levels of the water in a reliable and efficient manner and as occasion may require in the application of the invention to different kinds or sizes of tender tanks. An important advantage arising from the construction described is that the supply of the water itself governs and effects the operation of the apparatus, thus obviating the use of power appliance for the purpose.

I claim as my invention:

1. In an apparatus of the character described, a water tank, a receiver removably fitted in the tank and having a grated bottom, a series of receptacles automatically movable toward said receiver, and means controlled by variations in the level of the water in the tank for successively engaging said receptacles and moving them into said receiver to dump the contents thereof into the water.

2. In an apparatus of the character described, a water tank, a receiver projecting into said tank and having a grated bottom, an inclined trackway, a series of receptacles movable by gravity along said trackway toward said receiver, and means controlled by variations of the level of the water in the tank for controlling the movement of said receptacles and for successively dumping said receptacles into said receiver.

3. In an apparatus of the character described, a water tank, a receiver projecting into the said tank and having a grated bottom, an inclined trackway, a series of receptacles movable by gravity along said trackway toward the receiver, means for holding each receptacle against vertical movement, and releasing it for vertical movement and effecting its tilting movement toward the receiver when lifted, and upon reaching a predetermined position, and receptacle lifting means controlled by the level of the water in the tank for successively raising said receptacles for tilting them and dumping them into said receiver.

4. In an apparatus of the character described, a water tank, a receiver extending into said tank, a series of gravity-movable receptacles normally held from vertical movement and adapted to be raised and tilted into the said receiver upon reaching a predetermined position, a lifting device for raising and tilting the receptacles successively, and float-controlled means within the tank for operating said lifting device.

5. In an apparatus of the character described, a water tank, a receiver projecting into said tank and having a grated bottom, inclined track rails leading toward said receiver and having guide and stop rails along a portion of the length thereof, upper inclined guide and stop rails above the first named rails, a series of receptacles movable by gravity along said rails, each having laterally projecting pins to engage the upper guide and stop rails and laterally projecting lugs to engage the flanges of the lower rails, the arrangement of said rails being such that each receptacle in turn, when in an advanced position, will have its stop pins projecting beyond the upper rails and its stop lugs projecting beyond the lower rails, a lifting device for raising each receptacle in turn so as to bring said stop lugs in engagement with the upper rails to invert and dump the receptacle into the receiver, and float-controlled means within the tank for effecting the raising and lowering of said lifting device at predetermined intervals.

6. In an apparatus of the character described, a water tank, a receiver projecting into the said tank and having a grated bottom, a series of gravity-movable receptacles adapted to be raised and tilted in inverted position into the receiver, a vertically-movable rod for raising and dumping each advanced receptacle, a float for raising the rod, a latch for holding the rod in elevated position, and means controlled by the float for releasing the latch to permit the rod to gravitate downward.

7. In an apparatus of the character described, a water tank, a receiver having a grated bottom extending into the tank, a series of automatically movable receptacles, means for successively guiding the receptacles when elevated so as to invert and dump said receptacles into the receiver, a vertical lifting rod for elevating said receptacles, a float within the tank for raising the rod when the water level is raised therein, a latch for holding the rod in raised position, and means controlled by the descent of the float independent of the rod for releasing said latch.

8. In an apparatus of the character described, a water tank, a receiver having a grated bottom extending into the tank, a series of automatically-movable receptacles adapted to be raised and dumped into said receiver, a vertically-movable lifting rod for successively raising said receptacles, a float for raising said rod, a pivotally supported latch to engage and hold the rod elevated, and a trip device controlled by the float for retracting said latch to permit the rod to drop by gravity.

9. In an apparatus of the character described, a water tank a receiver having a grated bottom extending into the tank, a series of automatically-movable receptacles adapted to be successively raised and dumped into the tank, a vertically movable rod for successively raising and dumping said receptacles, a vertically-movable float in the tank, engaging means slidably connecting the float with the rod and adapted for the transfer of upward motion to the rod upon the elevation of the float and to permit the float to descend independently of the rod, locking means for securing the rod in elevated position and means controlled by the float upon the descent thereof for releasing said locking means.

10. In an apparatus of the character described, a water tank, a receiver projecting into the tank, and having a grated bottom, a series of receptacles automatically movable toward the receiver and adapted to be lifted and dumped thereinto, a vertically movable rod for succesively lifting and dumping said receptacles, a vertically movable float, an adjustable sliding connection between the float and rod including an abutment whereby the rod is adapted to be elevated with the float and the float to descend independently of the rod, an automatic latch to engage and lock the rod in elevated position, said latch being provided with a trip member, and a trip member adjustably connected with the float and adapted for engagement upon the descent of the float with the first named trip member to release the latch and permit the rod to drop by gravity.

In testimony whereof I affix my signature in presence of two witnesses.

WILLIAM BUCKLEY.

Witnesses:
 Geo. G. Macdonald,
 Signa Wyberg.